(12) United States Patent
Blinick et al.

(10) Patent No.: US 7,934,045 B2
(45) Date of Patent: Apr. 26, 2011

(54) REDUNDANT AND FAULT TOLERANT CONTROL OF AN I/O ENCLOSURE BY MULTIPLE HOSTS

(75) Inventors: Stephen L. Blinick, Tucson, AZ (US); John C. Elliott, Tucson, AZ (US); Enrique Q. Garcia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 12/481,401

(22) Filed: Jun. 9, 2009

(65) Prior Publication Data
US 2010/0312942 A1 Dec. 9, 2010

(51) Int. Cl.
*G06F 13/00* (2006.01)
(52) U.S. Cl. .......... 710/316; 710/100; 710/110
(58) Field of Classification Search .......... 710/316, 710/65, 100, 110; 709/208
See application file for complete search history.

(56) References Cited

U.S. PATENT DOCUMENTS

| | | | |
|---|---|---|---|
| 5,630,075 A * | 5/1997 | Joshi et al. ............ | 711/100 |
| 5,881,250 A * | 3/1999 | Young .................. | 710/306 |
| 5,964,845 A * | 10/1999 | Braun et al. ............ | 713/375 |
| 6,029,226 A * | 2/2000 | Ellis et al. ............. | 711/100 |
| 6,185,631 B1 * | 2/2001 | Casper et al. ........... | 710/20 |
| 6,253,094 B1 * | 6/2001 | Schmutz .............. | 455/562.1 |
| 6,385,666 B1 * | 5/2002 | Thornton et al. ........ | 710/2 |
| 6,892,298 B2 * | 5/2005 | West .................. | 713/2 |
| 7,194,540 B2 * | 3/2007 | Aggarwal et al. ........ | 709/225 |
| 7,315,456 B2 | 1/2008 | Mondor et al. | |
| 7,370,224 B1 | 5/2008 | Jaswa et al. | |
| 7,403,715 B2 * | 7/2008 | Bjorndahl et al. ........ | 398/121 |
| 7,685,335 B2 * | 3/2010 | Arndt et al. ........... | 710/56 |
| 2002/0010802 A1 * | 1/2002 | Kang et al. ............ | 709/253 |
| 2003/0056059 A1 * | 3/2003 | Fox et al. ............. | 711/112 |
| 2006/0038707 A1 * | 2/2006 | Walker et al. .......... | 341/50 |
| 2006/0112293 A1 * | 5/2006 | Przybysz et al. ......... | 713/400 |
| 2006/0209863 A1 * | 9/2006 | Arndt et al. ........... | 370/412 |
| 2007/0028293 A1 * | 2/2007 | Boerries et al. .......... | 726/2 |

(Continued)

FOREIGN PATENT DOCUMENTS

EP 447228 A2 * 9/1991

(Continued)

OTHER PUBLICATIONS

IBM Technical Disclosure Bulletin, "NA8908125: Improved Print Throughput Via Multiple Index Command Task Scheduling", Aug. 1, 1989, IBM, vol. 32, Iss. 3A, pp. 125-127.*

(Continued)

*Primary Examiner* — Faisal M Zaman
(74) *Attorney, Agent, or Firm* — Kunzler Needham Massey & Thorpe (57) ABSTRACT

An apparatus, system, and method are disclosed for reliably controlling an I/O enclosure. A bus module receives two or more Peripheral Component Interconnect Express ("PCIe") sideband signals via one or more PCIe cables. The one or more PCIe cables are connected between one or more hosts and an I/O enclosure. A decode module determines an asserted value of each of the two or more PCIe sideband signals and combines the PCIe sideband signal asserted values to form a bus value. Each PCIe sideband signal represents a bit in the bus value, and the bus value specifies a command for controlling the I/O enclosure. An execution module executes the specified command to perform control actions on the I/O enclosure.

20 Claims, 6 Drawing Sheets

U.S. PATENT DOCUMENTS

| | | | |
|---|---|---|---|
| 2007/0204075 A1* | 8/2007 | Rajan et al. | 710/22 |
| 2007/0239925 A1 | 10/2007 | Koishi | |
| 2007/0260789 A1* | 11/2007 | Ho et al. | 710/100 |
| 2008/0126641 A1* | 5/2008 | Irish et al. | 710/112 |
| 2009/0006712 A1* | 1/2009 | Ehsan et al. | 711/1 |
| 2009/0006780 A1* | 1/2009 | Sato et al. | 711/154 |
| 2009/0279889 A1* | 11/2009 | Kirkpatrick et al. | 398/41 |
| 2010/0028016 A1* | 2/2010 | Von Lerber | 398/138 |
| 2010/0180067 A1* | 7/2010 | Garcia et al. | 711/103 |
| 2010/0262863 A1* | 10/2010 | Hess | 714/32 |

FOREIGN PATENT DOCUMENTS

| | | | |
|---|---|---|---|
| EP | 1818840 A2 * | 8/2007 | |
| JP | 63240628 A * | 10/1988 | |
| JP | 64002142 A * | 1/1989 | |
| JP | 2009009264 A * | 1/2009 | |
| JP | 2009267449 A * | 11/2009 | |
| WO | WO 2005071422 A2 * | 8/2005 | |

OTHER PUBLICATIONS

Wiberg et al., "Combining of power control commands during soft handover in WCDMA," Sep. 7-10, 2003, IEEE, 14$^{th}$ IEEE Proceedings of Personal, Indoor and Mobile Radio Communications, vol. 2, pp. 1757-1760.*

Hughes et al., "BladeCenter processor blades, I/O expansion adapters, and units," Nov. 2005, IBM, IBM Journal of Research and Development, vol. 49, No. 6, pp. 837-859.*

Gregg, T. A., "S/390 CMOS server I/O: The continuing evolution," Jul. 2007, IBM, IBM Journal of Research and Development, vol. 41, No. .4.5, pp. 449-462.*

* cited by examiner

REDUNDANT AND FAULT TOLERANT CONTROL OF AN I/O ENCLOSURE BY MULTIPLE HOSTS

FIELD

This invention relates to Input/Output enclosures ("I/O enclosures") and more particularly relates to utilizing sideband signals in a peripheral component interconnect express ("PCIe") architecture to provide a redundant and fault tolerant system for controlling an I/O enclosure.

BACKGROUND

Description of the Related Art

Complex electronic systems, such as those with multiple processors or the like, often utilize smaller subsystems to facilitate input output ("I/O") communications between a host and external or remote devices. In conventional systems, an I/O enclosure may be used to house the logic devices, adapters, connectors, and hardware for handling and routing I/O communications and providing connectivity between a host and a destination device such as a storage unit processor.

Industry standards have been developed for establishing communication buses between a host and an I/O enclosure in an efficient uniform manner. Those of skill in the art will readily recognize the Peripheral Component Interconnect ("PCI") specification that has been in use for many years. More recently, a new technology specification has been developed called PCI Express ("PCIe") that is emerging as an industry standard for connecting various electronic systems and sub-systems within devices such as computers, servers, desktops, and the like. Conventional systems regularly utilize the PCIe standard to connect one or more hosts with an I/O enclosure. Typically a PCIe cable is connected between the host and the I/O enclosure, and electronic signals are sent through the PCIe cable from one device to another.

Figure 1:
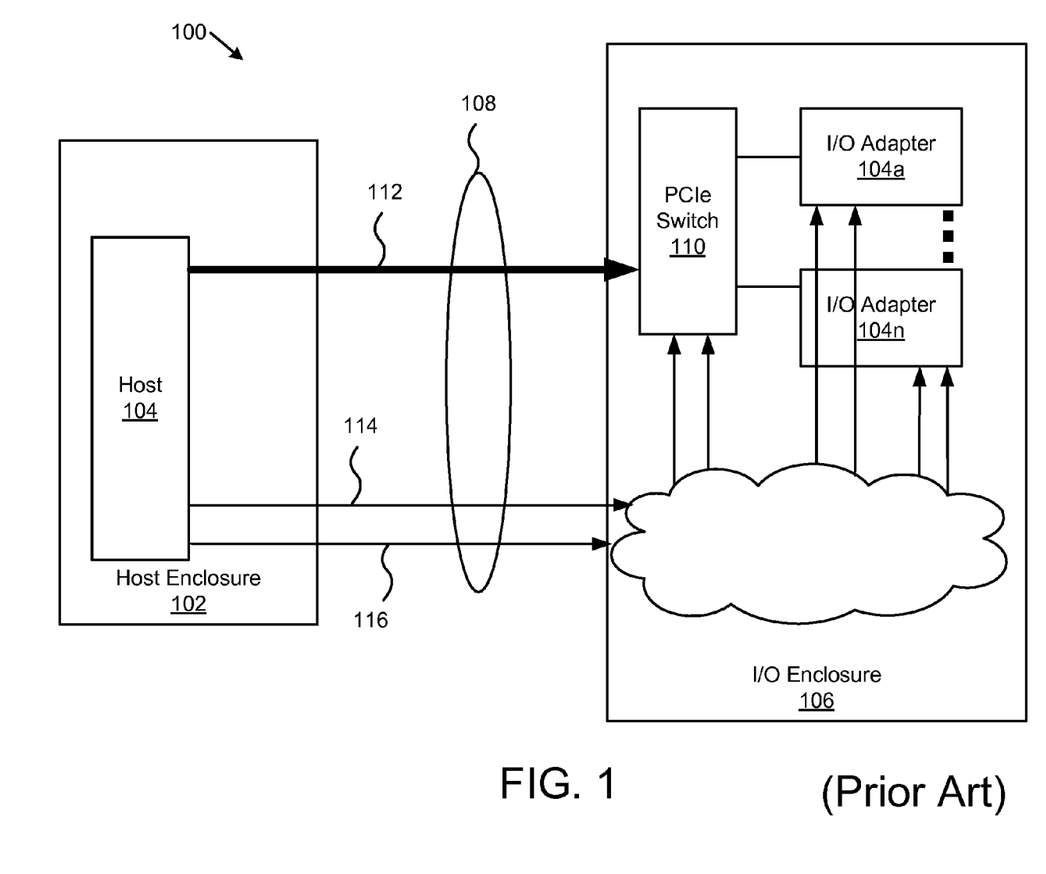
FIG. 1 is a schematic block diagram illustrating one embodiment of a system for communication between a host and an I/O enclosure in accordance with the prior art.

FIG. 1 depicts a system 100 for using a PCIe standard to enable communication between various electronic devices. The system 100 includes a host enclosure 102, a host 104, and an I/O enclosure 106. A PCIe cable 108 is provided to connect the host enclosure 102 to the I/O enclosure 106. Within the I/O enclosure 106 a PCIe switch 110 distributes a primary PCIe data link 112 to multiple I/O adapters 104a-n. The primary data link 112 is used to transfer data between the host 104 and the I/O adapters 104a-n.

The PCIe cable standard 108 also provides for a number of level sensitive sideband signals 114, 116 which are used to provide control signals to the I/O enclosure. The sideband signals may include CPRWON 114 which is an ON/OFF signal for the I/O enclosure and CPERST# 116 which is a RESET signal for the I/O enclosure 106 (other sideband signals are also available on the PCIe cable not listed here). The sideband signals 114, 116 are used to control the operations of the I/O enclosure such as turning on the enclosure or resetting the enclosure. For example, if the host 104 needs to power ON/OFF or RESET the I/O enclosure 106, then the host 104 simply needs to assert or de-assert the appropriate level sensitive signal 114, 116.

In a redundant system, multiple hosts may be attached to a single I/O enclosure 106 such that a PCIe cable 108 is connected between each host 104 and the I/O enclosure 106. Each PCIe connection includes its own set of sideband signals 114, 116 for controlling the I/O enclosure 106 which can result in conflicts and control problems. This is because the level sensitive ON/OFF and RESET signals 114, 116 create a single point of failure when a single host 104 or one of its level sensitive signals 114, 116 fail. If one host 104 fails, then the entire system 100 may become inoperable. For example, suppose a host 104 malfunctions and inadvertently sends a RESET signal to the I/O enclosure 106. The I/O enclosure will unnecessarily be reset, thereby affecting communications with a second host that is still operating properly.

Even when both hosts are operating normally, the I/O enclosure 106 must somehow resolve conflicts between the two hosts. For example, one host 104 may indicate an ON signal and the other host may indicate an OFF signal. In a redundant system, there can be no confusion or single host failure that would disrupt access to the I/O enclosure by either operative host.

The present invention resolves problems associated with I/O enclosure control and more particularly problems associated with single point of failure PCIe systems and multiple host systems.

BRIEF SUMMARY

From the foregoing discussion, it should be apparent that a need exists for an apparatus, system, and method that provide a reliable, redundant, and fault tolerant way of controlling an I/O enclosure. Beneficially, such an apparatus, system, and method would redefine the standard PCIe sideband signals as bits on a control bus and utilize the control bus to send encoded control signals to the I/O enclosure. The invention would also preferably receive alerts back from the I/O enclosure to the host to indicate a status of the I/O enclosure.

The present invention has been developed in response to the present state of the art, and in particular, in response to the problems and needs in the art that have not yet been fully solved by currently available I/O enclosures, hosts, and PCIe communication standards. Accordingly, the present invention has been developed to provide an apparatus, system, and method for controlling an I/O enclosure using existing PCIe sideband signals that overcome many or all of the above-discussed shortcomings in the art.

The apparatus to control an I/O enclosure is provided with a plurality of modules configured to functionally execute the necessary steps of encoding PCIe sideband signals to act as a control bus. These modules in the described embodiments include a bus module, a decode module, and an execution module.

The bus module, in one embodiment, receives two or more Peripheral Component Interconnect Express ("PCIe") sideband signals via one or more PCIe cables. The one or more PCIe cables are connected between one or more hosts and an I/O enclosure. The decode module determines an asserted value of each of the two or more PCIe sideband signals and combines the PCIe sideband signal asserted values to form a bus value. Preferably, each PCIe sideband signal represents a bit in the bus value, and the bus value specifies a command for controlling the I/O enclosure. The execution module executes the specified command to perform control actions on the I/O enclosure.

The decode module, in one embodiment, is configured to decode a sequence of two or more bus values received by the bus module. The sequence of two or more bus values may correspond to a command for controlling the I/O enclosure. For example, each command may correspond to a sequence of three subsequently received bus values. In a further embodiment, two or more hosts are connected to the I/O enclosure such that each host may send distinct control commands to the I/O enclosure. In such an embodiment, the decode module may discard bus value sequences specifying a new command during execution of a previous command. In yet a further embodiment, a sequence of bus values is defined for each command in a set of commands for controlling the I/O enclosure.

In one embodiment, the set of commands may include one or more of a command to perform a sequenced reset of a PCIe switch and all I/O adapters ("Autotimed I/O Tower Total Data Path Reset"), a command to perform a sequenced reset of all I/O adapters without resetting a PCIe switch ("Auto-timed Total I/O Slot Reset"), a command that powers off a PCIe switch and puts all I/O adapters into a standby state ("I/O tower Data Path Power OFF"), and a command that powers on a PCIe switch and all I/O adapters ("I/O tower Data Path Power On").

In one embodiment of the apparatus, two or more hosts may be connected to the I/O enclosure, and the decode module may discard bus values specifying a new command during execution of a previous command. In another embodiment, the bus module may be further configured to send an alert back to a host, the alert indicating an operating status of the I/O enclosure. For example, the bus module may send an alert to the host in response to one or more of the I/O enclosure not being present, the PCIe cable not being connected, the I/O enclosure not being powered on, and the decode module determining that the bus value is an invalid value.

In one embodiment, the sideband signals comprise two or more of an on/off signal ("CPWRON"), a reset signal ("CPERST#"), a wake signal ("CWAKE#"), and a cable present signal ("CPRSNT#"). In a further embodiment, the asserted values of each of the on/off signal ("CPWRON"), reset signal ("CPERST#"), and wake signal ("CWAKE#") comprise bits forming the bus value. In yet a further embodiment, the cable present signal ("CPRSNT#") comprises an alert signal utilized by the bus module to send an alert back to a host, the alert indicating an operating status of the I/O enclosure.

A system of the present invention is also presented to control an I/O enclosure. The system in the disclosed embodiments substantially includes the steps necessary to carry out the functions presented above with respect to the operation of the described apparatus in the disclosed embodiments. The system may be embodied to include one or more hosts, an I/O enclosure connected to each of the one or more hosts via one or more PCIe cables, and the modules as described above include the bus module, decode module, and execution module. In various additional embodiments, the system may include one or more PCIe switches and one or more I/O adapters connected to at least one of the PCIe switches.

A method of the present invention is also presented for controlling an I/O enclosure. The method in the disclosed embodiments substantially includes the steps necessary to carry out the functions presented above with respect to the operation of the described apparatus and system. In one embodiment, the method includes the steps associated with the modules described above with regard to the apparatus and system. The method may include receiving two or more PCIe sideband signals via one or more PCIe cables, where the PCIe cables are connected between one or more hosts and an I/O enclosure. The method may also include determining an asserted value of each of the two or more sideband signals and combining the sideband signal asserted values to form a bus value. Preferably, the bus value, or a sequence of bus values, specifies a command for controlling the I/O enclosure. The method may also include executing the specified command to perform control actions on the I/O enclosure such as reset and on/off commands.

In some embodiments, the modules and steps described above with regard to the apparatus, system, and method may be implemented as a computer program product that includes a computer readable storage medium.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software as stored on a computer readable storage medium for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
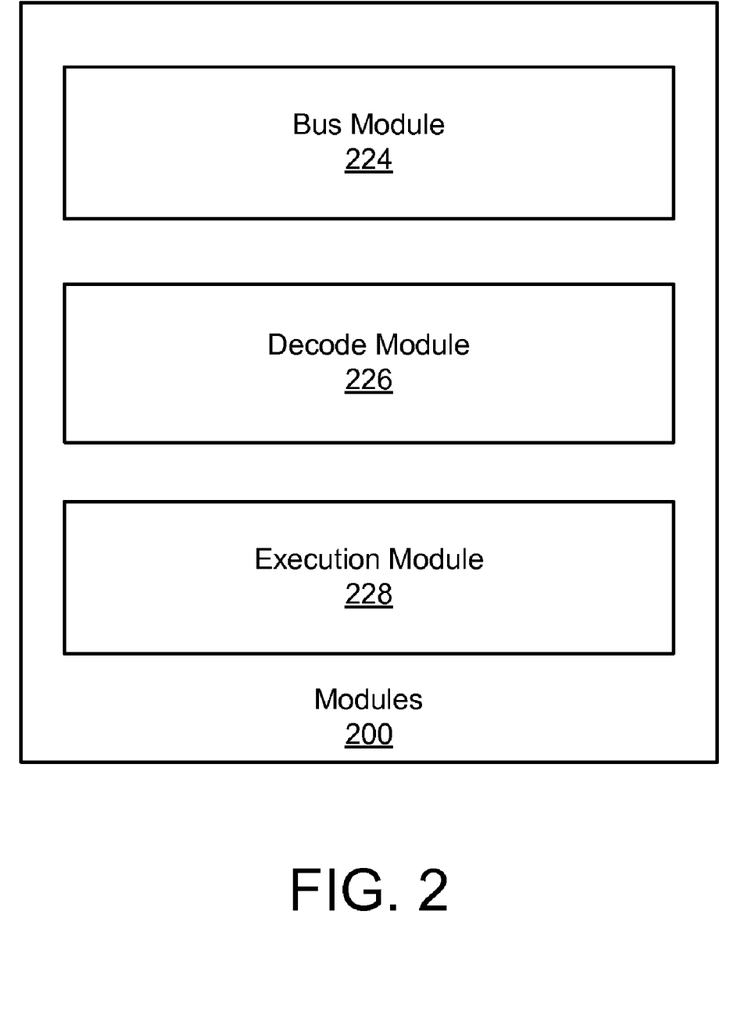
FIG. 2 is a schematic block diagram illustrating one embodiment of modules for facilitating communication between a host and an I/O enclosure in accordance with the present invention.

FIG. 2 is a schematic block diagram illustrating one embodiment of a group of modules 200 for facilitating communication between a host and an I/O enclosure in accordance with the present invention. The modules 200 include a bus module 224, a decode module 226, and an execution module 228. In various embodiments, the modules 200 may be implemented across various components of a system or may be implemented within a single system component. For example, the modules 200 may include logic and hardware, or may be implemented or stored as logic or hardware, across one or more hosts, host enclosures, I/O enclosures, components of an I/O enclosure, peripheral devices, etc.

Preferably, the modules 200 operate to enable communication between a host and an I/O enclosure using a peripheral component interconnect express ("PCIe") standard. A PCIe cable may be utilized to connect one or more hosts to the I/O enclosure. The modules 200, in conjunction with other system components associated with a host-I/O enclosure environment, provide a redundant and fault tolerant system for controlling an I/O enclosure by redefining and encoding standard PCIe cable signals to provide commands from a host to an I/O enclosure. More specifically, the modules 200 utilize conventional sideband signals found in a PCIe standard environment to generate an I/O enclosure control bus that enables encoded commands to be sent between a host and an I/O enclosure. In one embodiment, the sideband signals act as bits in the generated I/O enclosure control bus. In a further embodiment, each command may be specified by a sequence of control bus values to further ensure stability and reliability of the control signals.

The bus module 224 is preferably configured to receive two or more PCIe sideband signals via one or more PCIe cables. The one or more PCIe cables preferably connect one or more hosts to an I/O enclosure. In one embodiment, the bus module 224 may include circuitry such as opto-isolators and other circuits to provide for electrical isolation and predictable behavior of the sideband signals. For example various combinations of transistors, resistors, and the like may be used to stabilize the sideband signals as they are sent and received by the bus module 224.

In one embodiment, a host may utilize General Purpose Input Outputs ("GPIOs") to drive the PCIe sideband signals to operate as bits of the I/O enclosure control bus. The bus module 224 may also receive the signals using respective GPIOs and subsequently provides the sideband signals to the decode module 226. In some embodiments, the bus module 224 may be implemented on a logic device, such as a Field Programmable Gate Array ("FPGA") or similar device that is programmed to properly receive the PCIe sideband signals.

Some examples of PCIe sideband signals that might be received by the bus module 224 include an on/off signal ("CPWRON"), a reset signal ("CPERST#"), a wake signal ("CWAKE#"), and a cable present signal ("CPRSNT#"). Those of skill in the art will recognize that these signals are conventionally used as level sensitive signals that are either asserted or de-asserted to implement control of an I/O enclosure. For example, the on/off signal ("CPWRON") would be asserted or de-asserted to turn off and on the I/O enclosure. In accordance with the present invention, two or more of the sideband signals are used to indicate a bit value within an I/O enclosure control bus as defined by the sideband signals. In one embodiment, one or more of the sideband signals, such as the cable present signal ("CPRSNT#"), may be used to send alerts from the I/O enclosure back to the host.

The decode module 226 determines an asserted value (i.e.: 1 or 0) for each of the two or more PCIe sideband signals and combines the PCIe sideband signal asserted values to form a bus value. For example, if three sideband signals are used to form the I/O enclosure control bus, then the bus value might be "b'111" if all of the signals are asserted. Preferably, each PCIe sideband signal represents a bit in the bus value. Table 1 shows one implementation for mapping PCIe sideband signals to act as an I/O enclosure control bus. Of course, other signal mappings and configurations are contemplated.

TABLE 1

| Re-Defined Signal Name | PCIe Cable Standard Signal Name | Direction |
|---|---|---|
| IO Enclosure Control Bus (P) | CPWRON | Host -> IO Enclosure |
| IO Enclosure Control Bus (1) | CPERST# | Host -> IO Enclosure |
| IO Enclosure Control Bus (0) | CWAKE# | Host -> IO Enclosure |
| IO Enclosure Alert | CPRSNT# | IO Enclosure -> Host |

As shown in the table, three PCIe sideband signals (CPWRON, CPERST#, and CWAKE#) are mapped to form the bits of the I/O enclosure control bus. The PCIe sideband signal CPWRON is mapped to the 'P' bit of the I/O enclosure control bus; CPERST# is mapped to the '1' bit; and CWAKE# is mapped to the '0' bit to form the I/O enclosure control bus 'b'P10'. Table 1 also depicts the mapping of the PCIe sideband signal CPRSNT# as an alert signal flowing in the opposite direction. The alert signal may be used to notify the host of an I/O enclosure status.

In one embodiment, the PCIe sideband signals may be further mapped to correspond to GPIOs on the host according to Table 2. Table 2 notes the direction of the signal flow (i.e.: from the host to the enclosure) as well as the type of connection (i.e.: open-drain output or input).

TABLE 2

| Signal Name | Direction | Type |
|---|---|---|
| IO Enclosure Control Bus (P) | Host -> IO Enclosure | Open-drain output |
| IO Enclosure Control Bus (1) | Host -> IO Enclosure | Open-drain output |
| IO Enclosure Control Bus (0) | Host -> IO Enclosure | Open-drain output |
| IO Enclosure Alert | IO Tower -> Host | Input |

As depicted in Table 2, the PCIe sideband signals used to form the bits of the I/O enclosure control bus are configured as open-drain output type GPIOs on the host side, and the alert signal is configured as an input on the host side. Those of skill in the art will recognize that different combinations and configurations of the PCIe sideband signals may be possible in other embodiments. For example, in one embodiment the I/O enclosure control bus may be implemented to use only two bits where those bits are defined by CPRSNT# and CPERST#.

In one embodiment, one or more I/O enclosure control bus values may correspond to a command for controlling the I/O enclosure. For example, the bus value b' 101 may correspond to a command to reset the I/O enclosure, and the bus value b' 110 may correspond to a command to turn on the I/O enclosure. Table 3 depicts one embodiment for mapping I/O enclosure control bus values to I/O enclosure commands.

TABLE 3

| IO_Enclosure_Control_Bus (P, 1:0) | State | Comments |
|---|---|---|
| b'111" | OFFLINE | IO Tower Alert is asserted |
| b'000' | IDLE | Default state |
| b'101' | STATE-A | |
| b'110' | STATE-B | |
| b'011' | STATE-C | |
| ALL OTHERS | INVALID | IO Tower Alert is asserted |

In the depicted embodiment of Table 3, the I/O enclosure control bus value) b'111 corresponds to an 'OFFLINE' state of the I/O enclosure; the bus value b'000 corresponds to an idle state of the I/O enclosure; the bus values b'101, b110, and b'011 correspond to specific states or commands for the I/O enclosure. By utilizing a bus value to specify I/O enclosure commands, the likelihood of a failure or miscommunication is reduced. However, to further improve reliability and fault tolerance, a sequence of bus values may be used for each command. For example, the sequential bus values b'100, b'110, b'001 may correspond to a command to reset or turn on the I/O enclosure. Specific sequences of I/O enclosure control bus values may be used to cause specific I/O enclosure control events to occur. Thus, the decode module 226 may be further configured to decode a sequence of two or more bus values received by the bus module 226, where the sequence of two or more bus values corresponding to a command for controlling the I/O enclosure.

Table 4 depicts one embodiment for mapping a sequence of bus values to a specific command in accordance with the bus values defined in Table 3. Of course other mappings, combinations, and sequences are contemplated herein.

TABLE 4

| | | | | | |
|---|---|---|---|---|---|
| Auto-timed IO Tower Total Data Path Reset | IDLE | STATE-A | STATE-B | STATE-C | IDLE |
| Auto-timed Total IO Slot Reset | IDLE | STATE-B | STATE-C | STATE-A | IDLE |
| IO tower Data Path Power OFF | IDLE | STATE-C | STATE-A | STATE-B | IDLE |
| IO tower Data Path Power ON | IDLE | STATE-A | STATE-C | STATE-B | IDLE |

As depicted in Table 4, a sequence of bus values is defined corresponding to a set of commands including a command to perform a sequenced reset of a PCIe switch and all I/O adapters ("Autotimed I/O Tower Total Data Path Reset"), a command to perform a sequenced reset of all I/O adapters without resetting a PCIe switch ("Auto-timed Total I/O Slot Reset"), a command that powers off a PCIe switch and puts all I/O adapters into a standby state ("I/O tower Data Path Power OFF"), and a command that powers on a PCIe switch and all I/O adapters ("I/O tower Data Path Power On"). Thus, using the mappings defined in Table 3 and Table 4, a sequence of control bus values of b'000 (IDLE), b'101 (STATE-A), b'110 (STATE-B), b'011 (STATE-C), and b'000 (IDLE) corresponds to a command to perform a sequenced reset of a PCIe switch and all I/O adapters ("Autotimed I/O Tower Total Data Path Reset"). In some embodiments, limitations may be implemented to specify an allowed period of time between a change in control bus values to allow enough time for the decode module to properly de-bounce and synchronize the bus transitions.

By using a sequence of control bus values to define a single command, additional fault tolerance is provided in redundant systems that include two or more hosts. For example, in a system with two hosts, each host may send conflicting commands or may attempt to simultaneously send different commands. Preferably, bus value sequences should be issued and allowed to complete by only one host at a time. However, in the event of a conflict, the decode module 226 may be configured to discard bus values and/or bus sequences that specify a new command during execution of a previous command.

Thus, conflicting commands will not be simultaneously received or executed, and preferably, executions of commands are not queued by the decode module 226 while another command is being processed. Furthermore, in additional embodiments, sequences of bus values that do not correspond to a defined command may also be discarded and ignored. Thus, only valid bus value sequences that correspond to a valid command will be allowed to cause an action on the I/O enclosure.

As depicted in Table 3 the bus module 224 may be configured to send an alert signal back to the host to indicate an operating status of the I/O enclosure. For example, an alert may be sent if the I/O enclosure is OFFLINE or if an invalid bus value is received. In one embodiment, the bus module 224 may send an alert to the host in response to one or more of the I/O enclosure not being present, the PCIe cable not being connected, the I/O enclosure not being powered on, and the decode module determining that the bus value is an invalid value. Typically, the alert signal is received by a GPIO on the host. In one embodiment, the host can poll the GPIO accordingly to obtain the status of the I/O enclosure, or in other embodiments, the alert signal may be used to generate an interrupt or other notification signal.

Once a valid command is received and decoded, the execution module 228 is executes the specified command to perform control actions on the I/O enclosure. Thus, if a RESET command is validly received, the execution module 228 operates to RESET the I/O enclosure or devices within the I/O enclosure accordingly.

Figure 3:
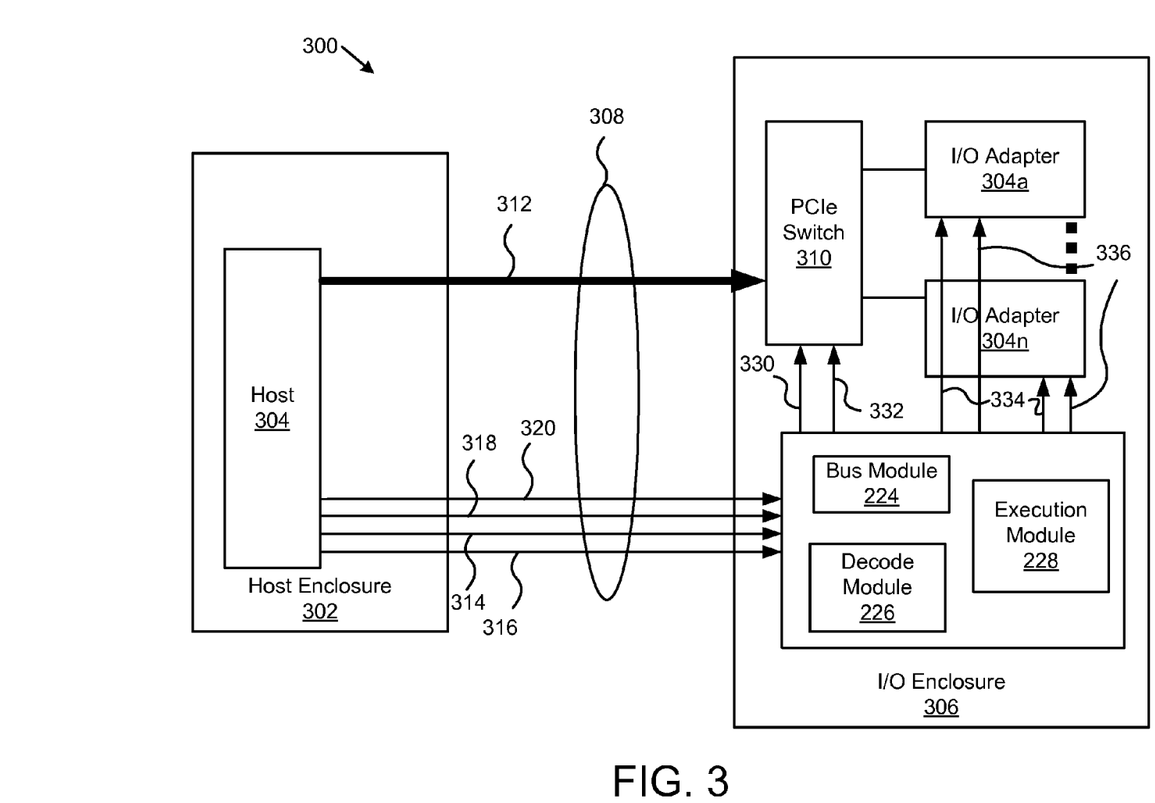
FIG. 3 is a schematic block diagram illustrating one embodiment of a system for communication between a host and an I/O enclosure in accordance with the present invention.

FIG. 3 is a schematic block diagram illustrating one embodiment of a system 300 for communication between a host and an I/O enclosure in accordance with the present invention. As depicted, the system 300 includes a host enclosure 302, a host 304, and an I/O enclosure 306. The host communicates with the I/O enclosure via a PCIe cable or connection 308. The PCIe cable includes a primary data link 312 for transferring data between the host 304 and the I/O enclosure 306. The primary data link 312 connects to a PCIe switch 310 that is used for routing the data to devices within the I/O enclosure 306 such as I/O adapters 304a-n.

The host 304 also sends PCIe sideband signals 314, 317, 318, and 320 through the PCIe cable 308 to the I/O enclosure 306. In the depicted embodiment, the I/O enclosure 306 includes the modules 200 including a bus module 224, a decode module 226, and an execution module 228. As described above, the bus module 224 receives two or more PCIe sideband signals 314, 316, 318, and 320 and the decode module 226 decodes the sideband signals into an I/O control bus value. The bus values are used to determine a valid I/O enclosure command, and the execution module 228 executes the command.

In one embodiment, the execution module 228 may send control signals 330-336 to control the I/O enclosure. For example, the execution module 228 may send a switch ON/OFF signal 330 to turn the PCIe switch 310 on or off, or the execution module 228 may send a switch reset signal 332 to the PCIe switch 310 to reset the PCIe switch. In further embodiments, the execution module 228 may send adapter ON/OFF signals 334 or adapter reset signals 336 to control operation of the adapters 304a-n. In various embodiments, signals may be sent uniquely to individually specified adapters 304a or may be sent collectively to a group of adapters 304a-n. FIG. 3 depicts a PCIe switch 310 and adapters 304a-n; however, it is contemplated that other devices and components may also be controlled in accordance with the present invention.

Figure 4:
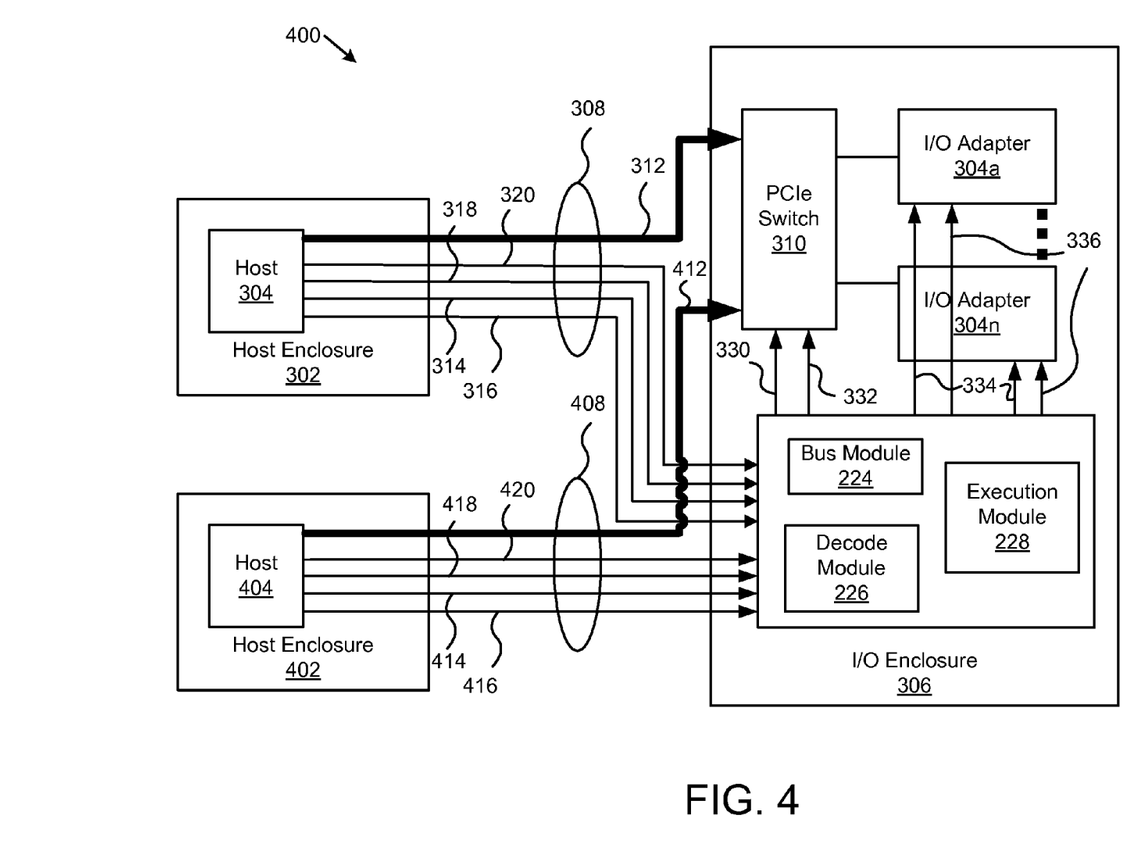
FIG. 4 is a schematic block diagram illustrating one embodiment of a system for communication between multiple hosts and an I/O enclosure in accordance with the present invention.

FIG. 4 is a schematic block diagram illustrating one embodiment of a system 400 for communication between multiple hosts and an I/O enclosure in accordance with the present invention. FIG. 4 is similar to FIG. 3 in that it includes a host enclosure 302, a host 304, and an I/O enclosure 306. However, as depicted in FIG. 4, a second host enclosure 402 is depicted as housing a second host 404. A second PCIe cable 408 is used to connect the host 404 to the I/O enclosure 306 to provide a second primary link 412 to the PCIe switch 310, and a second set of sideband signals 414, 416, 418, and 420 is provided to the I/O enclosure 306. In a preferred embodiment, the two hosts 304 and 404 are redundant and provide the system 300 with redundancy protection in the event of a failure of one of the host 304 and 404.

In the depicted embodiment, the bus module 224, decode module 226, and execution module operate to receive and execute commands from each host 304 and 404. The modules 200 further operate to provide fault tolerance in the system 300 by preventing single point of failure conditions by encoding and decoding I/O enclosure commands onto an I/O enclosure control bus made up of PCIe sideband signals 314, 316, 318, and 320. Commands to control the I/O enclosure such as ON/OFF commands and RESET commands are executed only if a valid command is properly received and decoded.

Thus, if one host 304 inadvertently asserts a sideband signal to turn OFF the I/O enclosure 306, the inadvertent signal will not result in a system 300 failure, because the I/O enclosure 306 will not reset without the proper control bus value or sequence. Therefore, the second host 404 will be able to continue appropriate communication with the I/O enclosure even thought the first host 304 may be malfunctioning. In this manner, the present invention provides a redundant, reliable, and fault tolerant system 300 for controlling an I/O enclosure 306.

Figure 5:
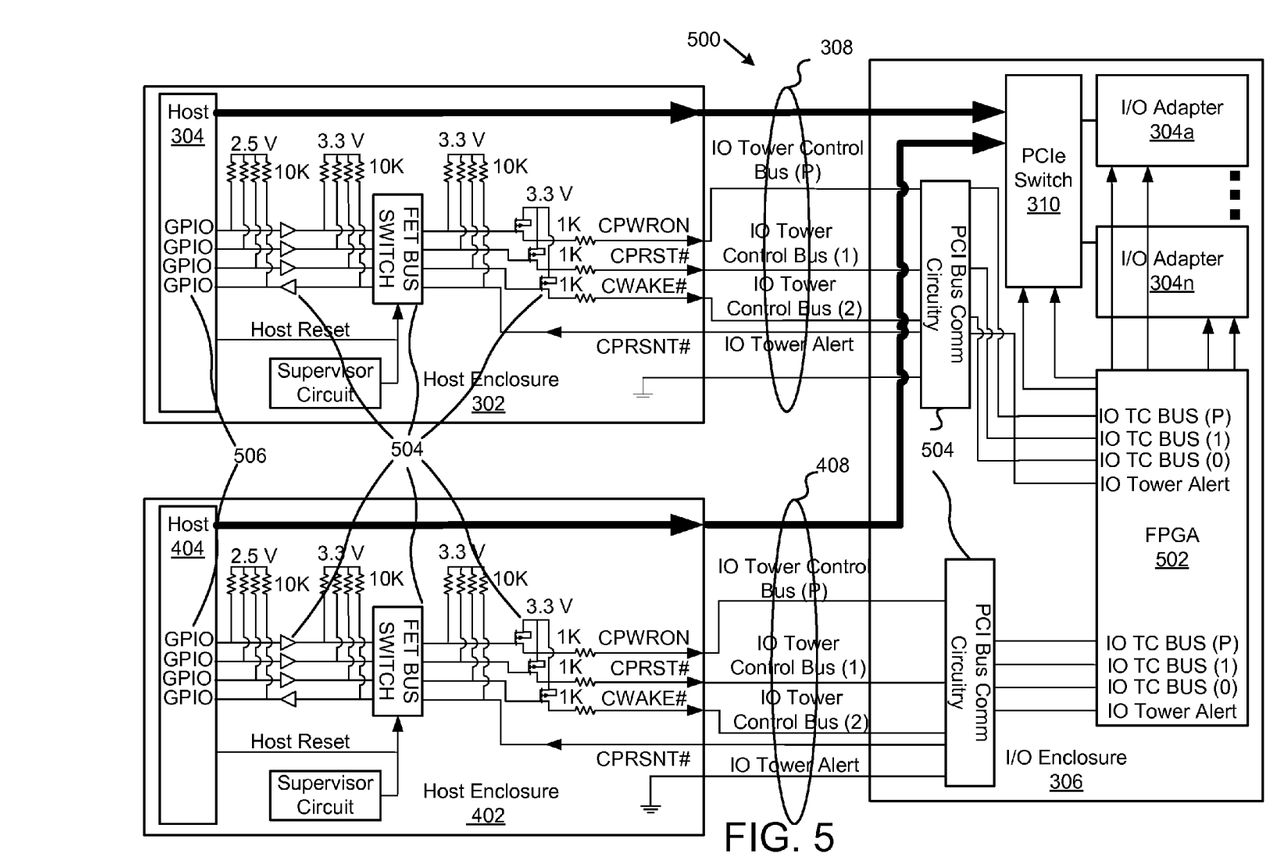
FIG. 5 is a schematic block diagram illustrating one detailed embodiment of the electronic circuitry for a system for communication between a host and an I/O enclosure in accordance with the present invention.

FIG. 5 is a schematic block diagram illustrating one detailed embodiment of the electronic circuitry for a system 500 for communication between a host and an I/O enclosure in accordance with the present invention Like FIG. 4, FIG. 5 depicts two host enclosures 302 and 402, two hosts 304 and 404, and an I/O enclosure 306 connected by two PCIe cables 308 and 408. FIG. 5 also depicts the mapping of the sideband control signals (CPWRON, CPERST#, CWAKE#, and CPRSNT#) to the I/O enclosure control bus (IO Tower Control Bus b'P10).

In the depicted embodiment, the I/O enclosure 306 includes an FPGA 502 that may be programmed to perform one or more of the operations associated with the bus module 224, decode module 226, and execution module. Additional circuitry 504 may also be provided for regulating and stabilizing the PCIe sideband signals including transistors, switches, controllers, and resistors. The circuitry 504 may include opto-isolators and other circuits to provide for electrical isolation and predictable behavior of the I/O enclosure control bus and alert signal. In one embodiment, the circuitry 504 operates in conjunction with GPIOs 506 on the host side to provide an appropriate direction of signal travel. The control bus signals travel from the hosts 304 and 404 to the I/O enclosure 306, and the alert signal travels from the I/O enclosure 306 back to the hosts 304 and 404. One of skill in the art will recognize the operation of the individual components depicted in FIG. 5 and used to drive a signal between the components of the system 500.

Figure 6:
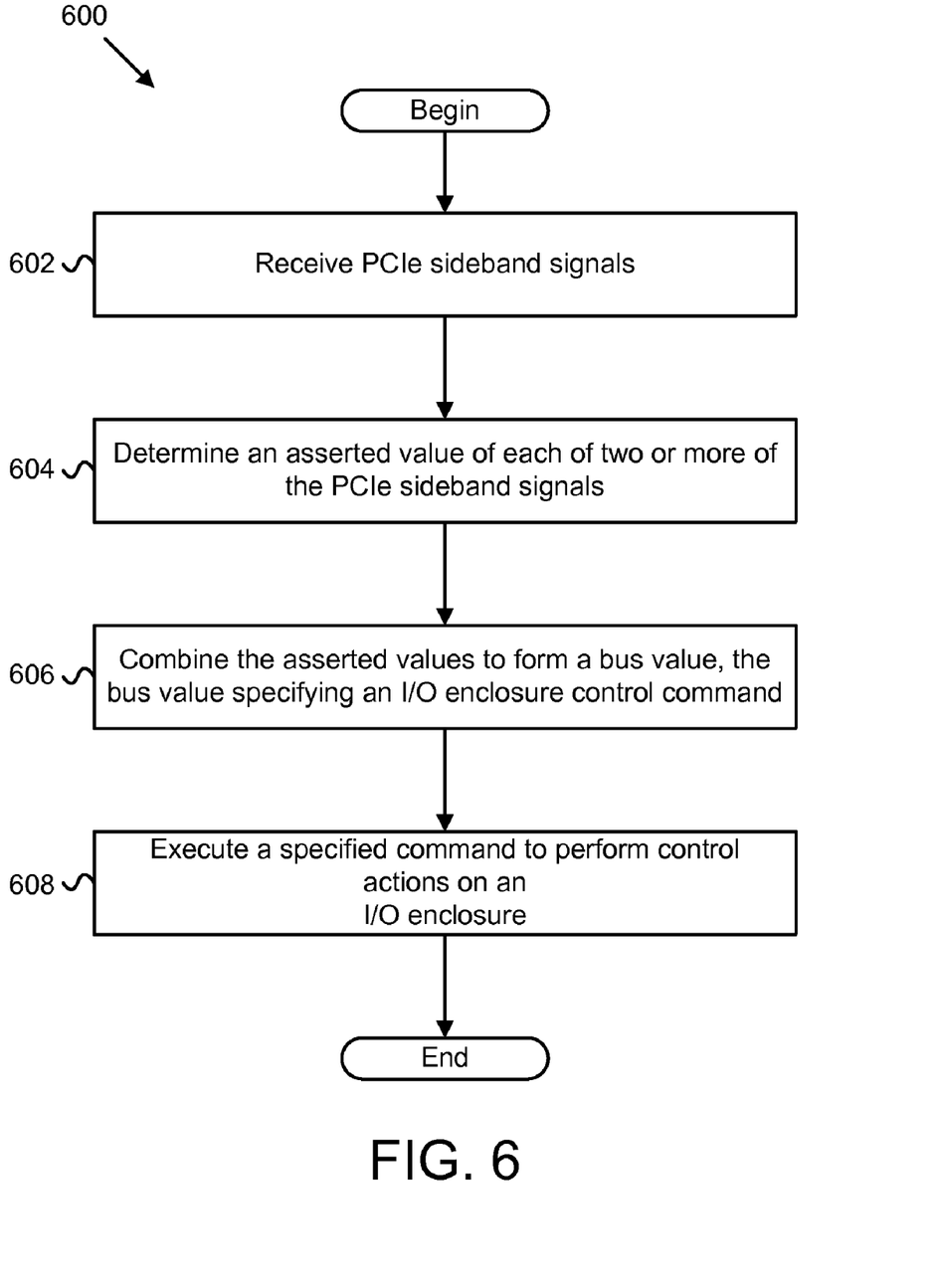
FIG. 6 is a schematic flow chart diagram illustrating one embodiment of a method for controlling an I/O enclosure in accordance with the present invention.

FIG. 6 is a schematic flow chart diagram illustrating one embodiment of a method 600 for controlling an I/O enclosure 306 in accordance with the present invention. The method 600 substantially includes the steps and embodiments discussed above and associated with the modules 200 including any steps not expressly depicted in FIG. 6.

The method 600 begins when a bus module 224 receives 602 two or more PCIe sideband signals via one or more PCIe cables. The one or more PCIe cables are connected between one or more hosts and an I/O enclosure 306 respectively. Next, a decode module 226 determines 604 an asserted value of each of two or more of the PCIe sideband signals and combines 606 the asserted values to form a bus value, where the bus value specifies an I/O enclosure control command for controlling the I/O enclosure 306. Preferably, each of the PCIe sideband signals act as individual bits of the bus value.

Finally, an execution module 228 executes 608 the specified command to perform a control action on the I/O enclosure 306. For example, the bus value might be mapped a set of commands including RESET and ON/OFF commands. In a further embodiment, the command might be specified by a sequence of consecutive bus values received by the bus module 224 and decoded by the decode module 226.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to control an I/O enclosure, the apparatus comprising:
an I/O enclosure;
a bus module that receives two or more peripheral component interconnect express ("PCIe") sideband signals via one or more PCIe cables, the one or more PCIe cables connected between one or more hosts and the I/O enclosure, an asserted value of each PCIe sideband signal specifying a preliminary command for controlling the I/O enclosure;
a decode module that determines the asserted value of each of the two or more PCIe sideband signals and combines the PCIe sideband signal asserted values to form a bus value by mapping each PCIe sideband signal to a bit in the bus value, each PCIe sideband signal and the specified preliminary command representing a bit in the formed bus value and the formed bus value comprising at least two bits, wherein the formed bus value is compared with a list of valid bus values, wherein each valid bus value corresponds to a final command for controlling the I/O enclosure and all formed bus values not on the list of valid bus values are invalid and are discarded by the decode module, wherein the bus module sends an alert signal to the one or more hosts when the decode module discards an invalid bus value; and
an execution module that executes by way of a processor the final command corresponding to the valid bus value associated with a valid formed bus value to perform control actions on the I/O enclosure.

2. The apparatus of claim 1, wherein the decode module is further configured to decode a sequence of two or more bus values received by the bus module, the sequence of two or more bus values are compared with a list of valid bus value sequences corresponding to a final commands for controlling the I/O enclosure.

3. The apparatus of claim 2, wherein two or more hosts are connected to the I/O enclosure, and wherein the decode module discards bus value sequences specifying a new command during execution of a previous command.

4. The apparatus of claim 2, wherein a valid sequence of bus values is defined for each final command in a set of final commands for controlling the I/O enclosure.

5. The apparatus of claim 4, wherein the set of final commands comprises one or more of a command to perform a sequenced reset of a PCIe switch and all I/O adapters ("Auto-timed I/O Tower Total Data Path Reset"), a command to perform a sequenced reset of all I/O adapters without resetting a PCIe switch ("Auto-timed Total I/O Slot Reset"), a command that powers off a PCIe switch and puts all I/O adapters into a standby state ("I/O tower Data Path Power OFF"), and a command that powers on a PCIe switch and all I/O adapters ("I/O tower Data Path Power On").

6. The apparatus of claim 1, wherein two or more hosts are connected to the I/O enclosure and wherein the decode module discards bus values specifying a new final command during execution of a previous final command.

7. The apparatus of claim 1, wherein the bus module is further configured to send an alert back to a host, the alert indicating an operating status of the I/O enclosure.

8. The apparatus of claim 7, wherein the bus module sends an alert to the host in response to one or more of the I/O enclosure not being present, the PCIe cable not being connected, the I/O enclosure not being powered on, and the decode module determining that the bus value is an invalid value.

9. The apparatus of claim 1, wherein the sideband signals comprise two or more of an on/off signal ("CPWRON"), a reset signal ("CPERST#"), a wake signal ("CWAKE#"), and a cable present signal ("CPRSNT#").

10. The apparatus of claim 9, wherein the asserted values of each of the on/off signal ("CPWRON"), reset signal ("CPERST#"), and wake signal ("CWAKE#") comprise bits forming the bus value.

11. The apparatus of claim 10, wherein the cable present signal ("CPSNT#") comprises an alert signal utilized by the bus module to send an alert back to a host, the alert indicating an operating status of the I/O enclosure.

12. A system to control an I/O enclosure, the system comprising:
one or more hosts;
at least one processor;
an I/O enclosure connected to each of the one or more hosts via one or more peripheral component interconnect express ("PCIe") cables;
a bus module that receives two or more PCIe sideband signals via the one or more PCIe cables, an asserted value of each PCIe sideband signal specifying a preliminary command for controlling the I/O enclosure;
a decoder module that determines the asserted value of each of the two or more sideband signals and combines the sideband signal asserted values to form a bus value by mapping each PCIe sideband signal to a bit in the bus value, each PCIe sideband signal and the specified preliminary command representing a bit in the formed bus value and the formed bus value comprising at least two bits, wherein the formed bus value is compared with a list of valid bus values, wherein each valid bus value corresponds to a final command for controlling the I/O enclosure and all other bus values are invalid and are discarded by the decode module, wherein the bus module sends an alert signal to the one or more hosts when the decode module discards an invalid bus value; and
an execution module that executes by way of a processor the final command corresponding to a valid formed bus value to perform control actions on the I/O enclosure.

13. The system of claim 12, wherein the decode module is further configured to decode a sequence of two or more bus values received by the bus module, a valid sequence of two or more bus values corresponding to a final command for controlling the I/O enclosure.

14. The system of claim 13, further comprising one or more I/O adapters connected to at least one of the one or more PCIe switches.

15. The system of claim 12, further comprising one or more PCIe switches.

16. A computer program product comprising a non-transitory computer readable storage medium having computer usable program code stored thereon executable to perform operations for controlling an I/O enclosure, the operations of the computer program product comprising:
receiving two or more peripheral component interconnect express ("PCIe") sideband signals via one or more PCIe cables, the one or more PCIe cables connected between one or more hosts and an I/O enclosure, an asserted value of each PCIe sideband signal specifying a preliminary command for controlling the I/O enclosure;
determining the asserted value of each of the two or more sideband signals and combining the sideband signal asserted values to form a bus value by mapping each PCIe sideband signal to a bit in the bus value, each PCIe sideband signal and the specified preliminary command representing a bit in the bus value and the bus value comprising at least two bits, wherein the formed bus value is compared with a list of valid bus values, wherein each valid bus value corresponds to a final command for controlling the I/O enclosure and all other bus values are invalid;
discarding invalid bus values that do not correspond to a final command and sending an alert signal to the one or more hosts when an invalid bus value is discarded; and
executing the final command corresponding to the valid formed bus value to perform control actions on the I/O enclosure.

17. The computer program product of claim 16, further comprising decoding a sequence of two or more bus values received by the bus module, a valid sequence of two or more bus values corresponding to a final command for controlling the I/O enclosure.

18. The computer program product of claim 17, wherein two or more hosts are connected to the I/O enclosure, and further comprising discarding bus value sequences that specify a new final command during execution of a previous final command.

19. The computer program product of claim 17, wherein a valid sequence of bus values is defined for each final command in a set of final commands for controlling the I/O enclosure.

20. The computer program product of claim 19, wherein the set of final commands comprises one or more of a command to perform a sequenced reset of a PCIe switch and all I/O adapters ("Autotimed I/O Tower Total Data Path Reset"), a command to perform a sequenced reset of all I/O adapters without resetting a PCIe switch ("Auto-timed Total I/O Slot Reset"), a command that powers off a PCIe switch and puts all I/O adapters into a standby state ("I/O tower Data Path Power OFF"), and a command that powers on a PCIe switch and all I/O adapters ("I/O tower Data Path Power On").

* * * * *